US008830507B2

(12) United States Patent
Matsuzawa

(10) Patent No.: US 8,830,507 B2
(45) Date of Patent: Sep. 9, 2014

(54) PRINTING SYSTEM INCLUDING A CODE READER FOR READING CODE PRINTED ON A RECORDING MEDIUM

(75) Inventor: Yoshihiko Matsuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 13/360,598

(22) Filed: Jan. 27, 2012

(65) Prior Publication Data

US 2012/0200885 A1 Aug. 9, 2012

(30) Foreign Application Priority Data

Feb. 3, 2011 (JP) .................................. 2011-021880

(51) Int. Cl.
*G06F 3/12* (2006.01)
*B41J 11/66* (2006.01)
*B41J 11/46* (2006.01)

(52) U.S. Cl.
CPC ................ *B41J 11/663* (2013.01); *B41J 11/46* (2013.01)
USPC .......................................... 358/1.15; 358/1.1

(58) Field of Classification Search
USPC ................................................. 358/1.15, 1.1
See application file for complete search history.

(56) References Cited

U.S. PATENT DOCUMENTS

| | | | | |
|---|---|---|---|---|
| 2005/0259289 A1* | 11/2005 | Ferlitsch et al. | ............. | 358/1.14 |
| 2006/0039021 A1* | 2/2006 | Kato et al. | .................... | 358/1.13 |
| 2006/0238803 A1* | 10/2006 | Kuroshima | .................... | 358/1.15 |
| 2008/0112002 A1* | 5/2008 | Farrell et al. | .................... | 358/1.9 |
| 2009/0161149 A1* | 6/2009 | Noguchi et al. | ............. | 358/1.15 |
| 2009/0263172 A1* | 10/2009 | Kovacs | ........................ | 399/341 |

FOREIGN PATENT DOCUMENTS

| | | |
|---|---|---|
| JP | 64-32150 | 2/1989 |
| JP | 2001-105700 | 4/2001 |
| JP | 2002-273993 | 9/2002 |
| JP | 2005-250624 | 9/2005 |

* cited by examiner

*Primary Examiner* — Benny Q Tieu
*Assistant Examiner* — Martin Mushambo
(74) *Attorney, Agent, or Firm* — Workman Nydegger

(57) ABSTRACT

A printing system includes a storage unit that associates and stores print job data and post processing job data; a printing unit that prints a code regarding the association on media when an image is printed on the media based on the print job data; a code reading unit that reads the code that is printed on the media; and a post processing unit that selects the post processing job data that is associated from the storage unit based on the read code and performs the post processing with respect to the media based on the selected post processing job data.

9 Claims, 15 Drawing Sheets

FIG. 11A
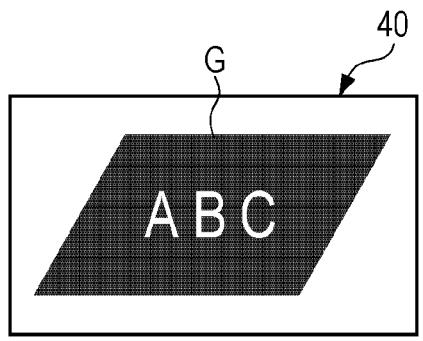
FIG. 11B
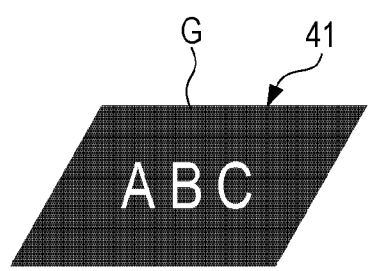
FIG. 12
| TITLE | EXAMPLE |
|---|---|
| JOB ID | AB100029-0 |
| X SIZE | 200 |
| Y SIZE | 150 |
| NUMBER IN X DIRECTION | 3 |
| NUMBER IN Y DIRECTION | 100 |
| TYPE OF PAPER | Adhesive Vinyl |
| THICKNESS OF PAPER | 0.2 |
| PRINT DATA | ABC |
| CUT DATA |  |

FIG. 14

| TITLE | EXAMPLE |
|---|---|
| JOB ID | AB100029-1 |
| X SIZE | 200 |
| Y SIZE | 150 |
| NUMBER IN X DIRECTION | 3 |
| NUMBER IN Y DIRECTION | 70 |
| TYPE OF PAPER | Adhesive Vinyl |
| THICKNESS OF PAPER | 0.2 |
| PRINT DATA | A B C |
| CUT DATA | |

FIG. 16

| TITLE | EXAMPLE |
|---|---|
| JOB ID | AB100029-2 |
| X SIZE | 200 |
| Y SIZE | 150 |
| NUMBER IN X DIRECTION | 3 |
| NUMBER IN Y DIRECTION | 30 |
| TYPE OF PAPER | Adhesive Vinyl |
| THICKNESS OF PAPER | 0.2 |
| PRINT DATA | ABC |
| CUT DATA |  |

PRINTING SYSTEM INCLUDING A CODE READER FOR READING CODE PRINTED ON A RECORDING MEDIUM

The entire disclosure of Japanese Patent Application No: 2011-021880, filed Feb. 3, 2011 is expressly incorporated by reference herein in its entirety.

BACKGROUND

1. Technical Field

The present invention relates to a printing system and a printing method.

2. Related Art

JP-A-2005-250624 discloses a printing system where an image is printed on paper based on print job data and a finishing process (a post processing) such as a stapling process or the like is performed with respect to the paper that the image is printed. The printing system has a configuration such that identifying data that prohibits the finishing process with respect to the banner page is inserted into print job data and the finishing process is performed only on paper on which the image according to an original image data is printed based on the identifying data.

However, as a post processing with respect to a printed material, other than the stapling process, there is a cutting process or the like that cuts out an image that is printed. However, in the post processing and printing, processing speed is different and for example, since the printing takes time for drying or the like, generally, printing is only performed temporarily, the printed material stored and then the post processing is performed.

However, in the above-described related art, when the printed material is removed from a printer or the like after printing and is processed offline, after that, is processed using a post processing machine, since unit for fastening the printed material (a print job) and a post processing job corresponding to the printed material is not present, there is a problem in that an operator may easily make a mistake such that the post processing job is erroneously designated in the post processing and make the printed material defective.

SUMMARY

An advantage of some aspects of the invention is that a printing system and a printing method are provided where a post processing may be accurately performed with respect to a printed material that is processed offline after printing.

In order to solve the above-described problem, according to an aspect of the invention, a printing system includes a storage unit that associates and stores print job data and post processing job data; a printing unit that prints a code regarding the association on media when an image is printed on the media based on the print job data; a code reading unit that reads the code that is printed on the media; and a post processing unit that selects the post processing job data that is associated from the storage unit based on the read code and performs the post processing with respect to the media based on the selected post processing job data.

According to the employment of the above-described configuration, in the invention, the print job data and the post processing job data are associated and spooled in the storage unit and when the printing is performed based on the print job data, the code regarding the association is also printed on the media. Since the code is printed on the media after printing, even though the media is stored temporarily, the post processing job that coincides with the media (the print job) from the post processing job that is spooled in the storage unit may be selected and performed when the code is read.

It is preferable that the print job data include data regarding the number of images printed on the media, and the printing unit has a post processing job data generation unit that generates the post processing job data according to the number of images printed on the media based on the print job data.

According to the employment of the above-described configuration, in the invention, the print job data includes data regarding the number of images to be printed on the media and even in a case where the number of images actually printed on the media by the printing unit does not satisfy the number of images to be printed, since the post processing job data is generated according to the number of images actually printed, the post processing job corresponding to the practical print job (the number of images) at the post processing unit may be performed.

It is preferable that the printing unit has a print job data generation unit that generates second print job data according to the number of images printed on the media based on the print job data.

According to the employment of the above-described configuration, in the invention, even in a case where the number of images actually printed on the media by the printing unit does not satisfy the number of images to be printed, since the second print job data is generated according to the number of images actually printed, the remainder of the print job that does not satisfy the number of the images to be printed may be completed.

It is preferable that the printing unit print the code after the image is printed on the media based on the print job data.

According to the employment of the above-described configuration, in the invention, since the printing unit actually prints the code after the image is printed on the media, the code may be printed according to the actual print situation and the association of the print job and the post processing job is exactly performed.

It is preferable that the printing unit prints on the media by a roll-to-roll manner.

According to the employment of the above-described configuration, in the invention, when the code is printed after the image is printed with respect to the media that is wound off from the wind off side roll by the roll-to-roll manner, since the printed barcode is not positioned at the center but at an outer periphery side in the wind out side roll that is paired with the wind off side roll, the roll is wound off without being rewound and the code may be read before the printed image in the post processing.

It is preferable that the storage unit store plural types of the print job data that is printed on the same media.

According to the employment of the above-described configuration, in the invention, even in a case where, the plural types of print jobs are performed on the same media, since the code is printed for every print job, the plural types of post processing jobs corresponding to the plural types of print jobs may be performed in the post processing unit.

According to another aspect of the invention, a printing method includes associating and storing print job data and post processing job data in a storage unit; printing a code regarding the association on media when an image is printed on the media based on the print job data; reading the code that is printed on the media; and selecting the post processing job data that is associated from the storage unit based on the read code and performing the post processing with respect to the media based on the selected post processing job data.

According to the employment of the above-described method, in the invention, the print job data and the post processing job data are associated and spooled in the storage unit and when the printing is performed based on the print job data, the code regarding the association is also printed on the media. Since the code is printed on the media after printing, even though the media is stored temporarily, the post processing job that coincides with the media (the print job) from the post processing job that is spooled in the storage unit may be selected and performed when the code is read.

BRIEF DESCRIPTION OF THE DRAWINGS

The invention will be described with reference to the accompanying drawings, wherein like numbers reference like elements.

FIGS. 11A and 11B are drawings illustrating print data and cut data in the embodiment of the invention.

FIG. 12 is a drawing illustrating data where print job data and cut job data are associated in the embodiment of the invention.

FIG. 14 is a drawing illustrating second data where print job data and cut job data are associated in the embodiment of the invention.

FIG. 16 is a drawing illustrating third data where print job data and cut job data are associated in the embodiment of the invention.

DESCRIPTION OF EXEMPLARY EMBODIMENTS

Hereinafter, description will be given regarding an embodiment of a printing system and a printing method according to the invention with reference to drawings.

Figure 1:
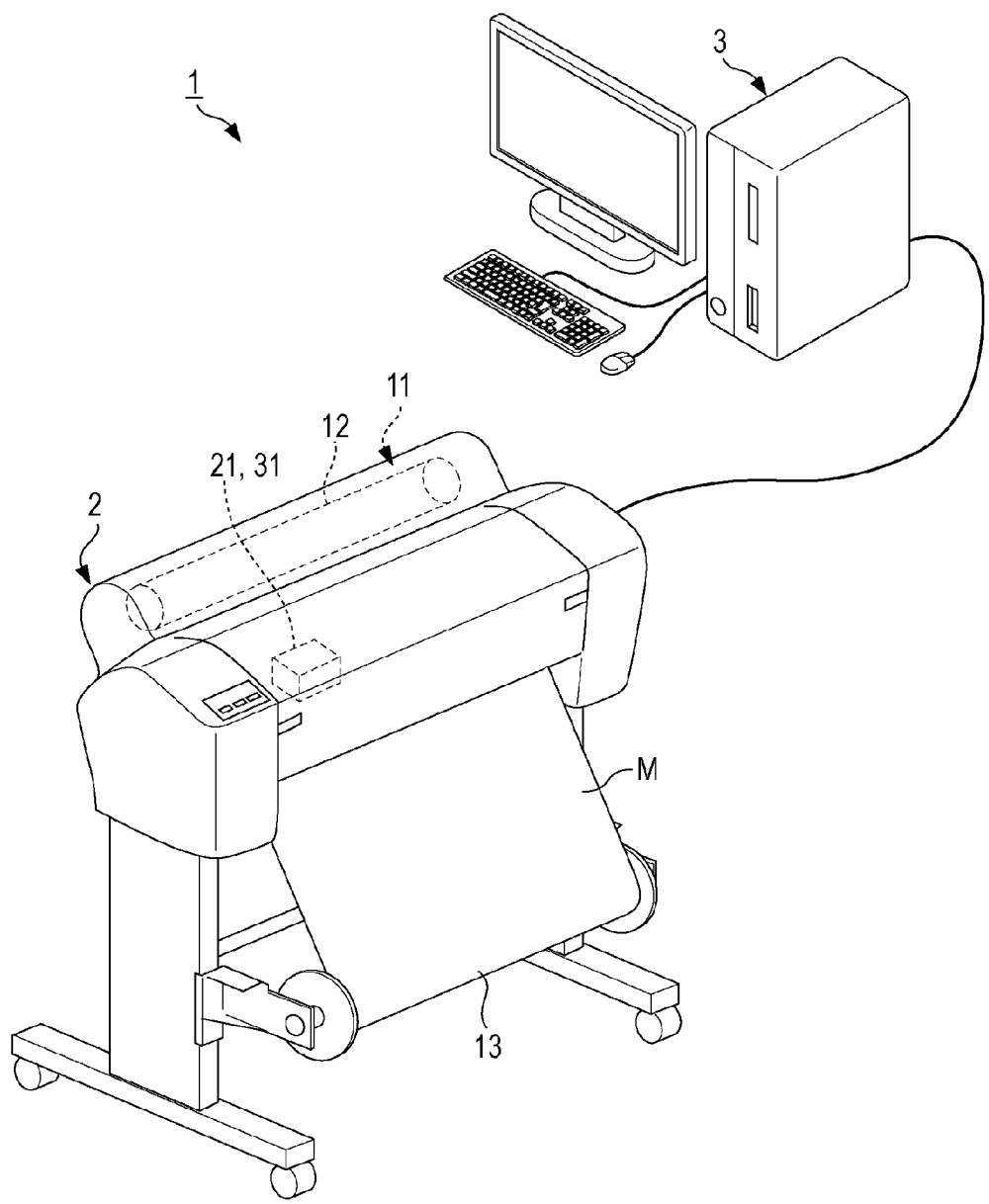
FIG. 1 is a drawing illustrating a configuration of a printing system in an embodiment of the invention.
Figure 2:
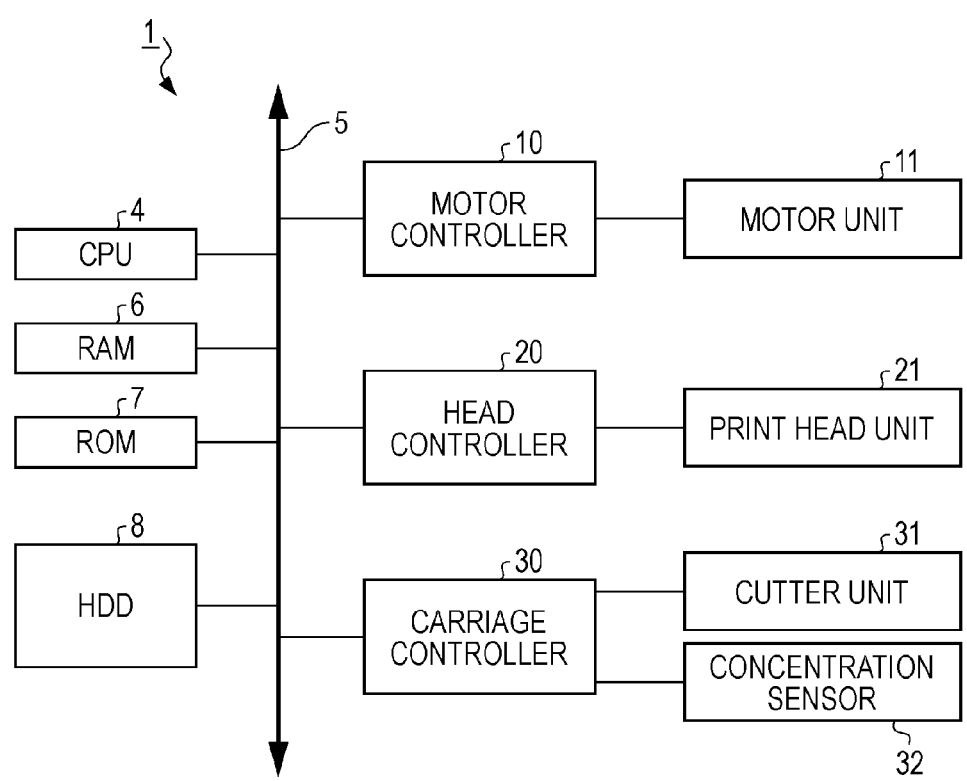
FIG. 2 is a block diagram illustrating an electric configuration of the printing system in the embodiment of the invention.
Figure 3:
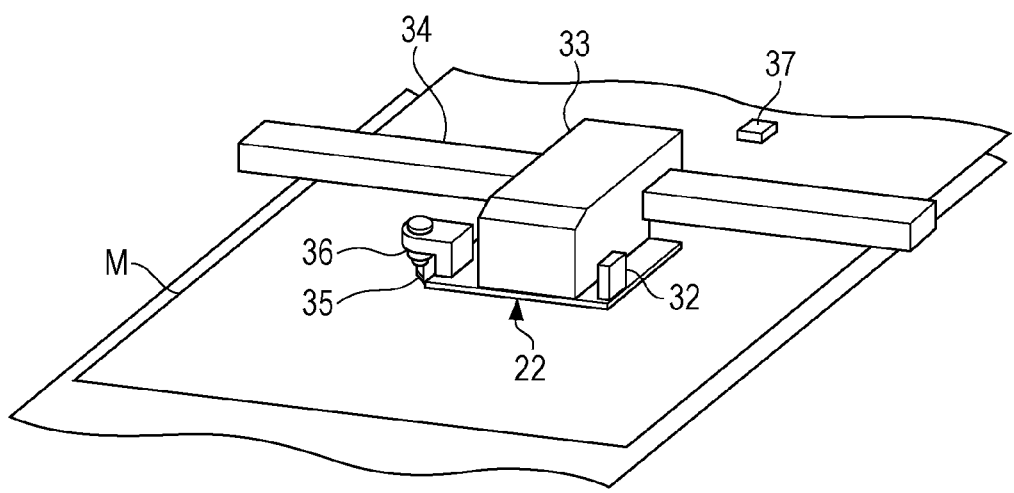
FIG. 3 is an internal configuration drawing of a printer configuring the printing system in the embodiment of the invention.

FIG. 1 is a drawing illustrating a configuration of a printing system 1 in an embodiment of the invention. FIG. 2 is a block diagram illustrating an electric configuration of the printing system 1 in the embodiment of the invention. FIG. 3 is an internal configuration drawing of a printer 2 configuring the printing system 1 in the embodiment of the invention.

As shown in FIG. 1, the printing system 1 has the printer 2 and a host computer 3. The printer 2 is an ink jet printer (a large format printer: LFP) that may continuously print an image while transporting media M in a roll-to-roll manner. In the embodiment, as the media M, cutting paper is exemplified, that may form a seal, label or the like by the cutting process (post processing) according to a printed image after printing.

As shown in FIG. 2, the printer 2 includes a CPU 4 that performs main control. A RAM 6, a ROM 7 and an HDD (a hard disk drive: a storage unit) 8 are connected to the CPU 4 through a bus 5. In addition, a motor unit 11 through a motor controller 10, a print head unit (a printing unit) 21 through a head controller 20, and a cutter unit (a post processing unit) 31 and a concentration sensor (a code reading unit) 32 are connected to the bus 5 through a carriage controller 30.

A control program for controlling the printer 2, a control parameter for driving the motor unit 11, a control parameter for driving the print head unit 21, a control parameter for driving the cutter unit 31 and the like are stored in the ROM 7. The HDD 8 associates and stores print job data that is to be printed on the media M, which is input at the host computer 3 or received through a network (not shown)and cut job data (post processing job data). In addition, the HDD 8 may be provided at any one of the printer 2 and the host computer 3.

The motor unit 11 includes a spindle that holds a wind off side roll 12 (see FIG. 1) winding off the media M and a spindle that holds a wind out side roll 13 winding up the media M after printing (neither are shown). The motor unit 11 has a configuration such that the spindles are driven to rotate and the media M is transported in the roll-to-roll manner based on a control command from the CPU 4.

As shown in FIG. 3, the print head unit 21 has an ink jet head 22 ejecting ink with respect to the media M that is transported in the roll-to-roll manner. The ink jet head 22 includes a plurality of nozzle columns and has a configuration such that ink of a predetermined colors (for example, yellow (Y), magenta (M), cyan (C) and black (K)) may be ejected from each of nozzle columns respectively.

The ink jet head 22 is mounted on a carriage 33. The carriage 33 is configured to move freely along a guide shaft 34 extended in a width direction (a main scanning direction) of the media M. The ink jet head 22 is synchronized with the transportation of the media M in a transportation direction (a sub-scanning direction) while moving in the width direction (the main scanning direction) of the media M by the carriage 33 and ejects ink with respect to the media M. Accordingly, a printing process that prints a predetermined image based on the print job data is performed.

The cutter unit 31 has a cutter blade 35 that is mounted on the carriage 33. The cutter blade 35 is held at a cutter holder 36. The cutter blade 35 has a configuration such that a teeth edge thereof freely rotates around a shaft that is extended in a vertical direction with respect to a printing surface of the media M. In addition, the cutter holder 36 includes an actuator (not shown) inside thereof and has a configuration such that the teeth edge of the cutter blade 35 freely moves between a contacting position where the teeth edge of the cutter blade 35 contacts the printing surface of the media M and a non-contacting position where the teeth edge does not contact the printing surface of the media M.

The cutter holder 36 has a configuration such that the cutter blade 35 is drawn up and the teeth edge is in a non-contacting state with respect to the printing surface of the media M when the print job is performed and the cutter blade 35 is descended and the teeth edge is in a contacting state with respect to the printing surface of the media M when the cut job is performed.

When the cut job is performed, the cutter blade 35 performs a cutting process that cuts out the image that is printed by moving the media M in the width direction (the main scanning direction), transporting the media M in the transportation direction (the sub-scanning direction) according to the carriage 33, and the direction of the teeth edge based on the cut job data.

The concentration sensor 32 is mounted on the carriage 33. The concentration sensor 32 has a configuration such that light is projected toward the media M and a reflected light amount that is reflected at the printing surface is measured so that a concentration density at the printing surface is detected. The concentration sensor 32 has a configuration such that the concentration density is detected at the printing surface so as to read a crop mark (a cut position reference mark) 51 that is printed with an image G shown in FIG. 10 as described below, and a barcode (a code) 50 that is printed with the image G.

A rear end detection sensor (a rear end detection unit) 37 is provided further upstream (rear side of the paper in FIG. 3) than the ink jet head 22 in the transportation direction of the media M. As the rear end detection sensor 37, various types of sensors may be used for detecting the rear end of the media M optically by light reflection or the like, or physically by contact. The rear end detection sensor 37 has a configuration such that the rear end of the media M is detected so that cutting of the paper may be detected before the rear end thereof arrives at the ink jet head 22.

Next description will be given regarding an operation (the printing method) of the printing system 1 having the above-described configuration using the flowcharts shown in FIGS. 4 to 9.

Figure 4:
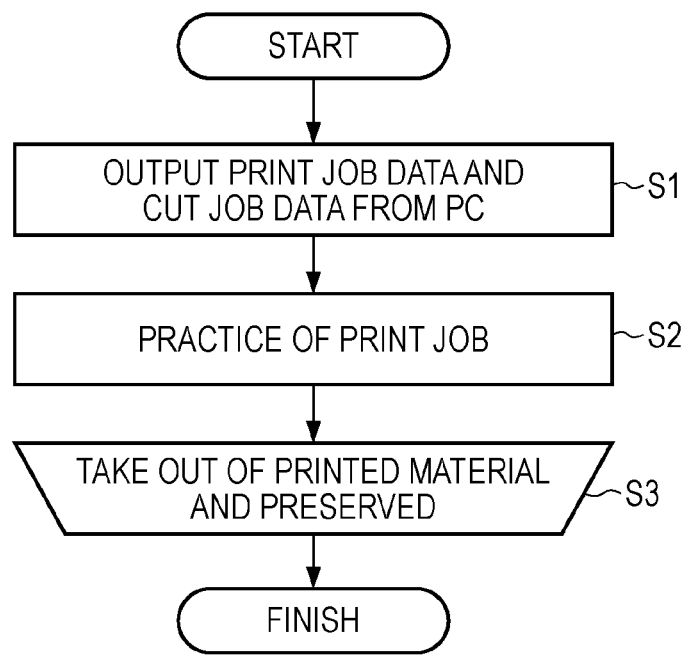
FIG. 4 is a schematic overall flowchart of when the printing in the embodiment of the invention is performed.

FIG. 4 is a schematic overall flowchart of when the printing in the embodiment of the invention is performed.

Figure 10:
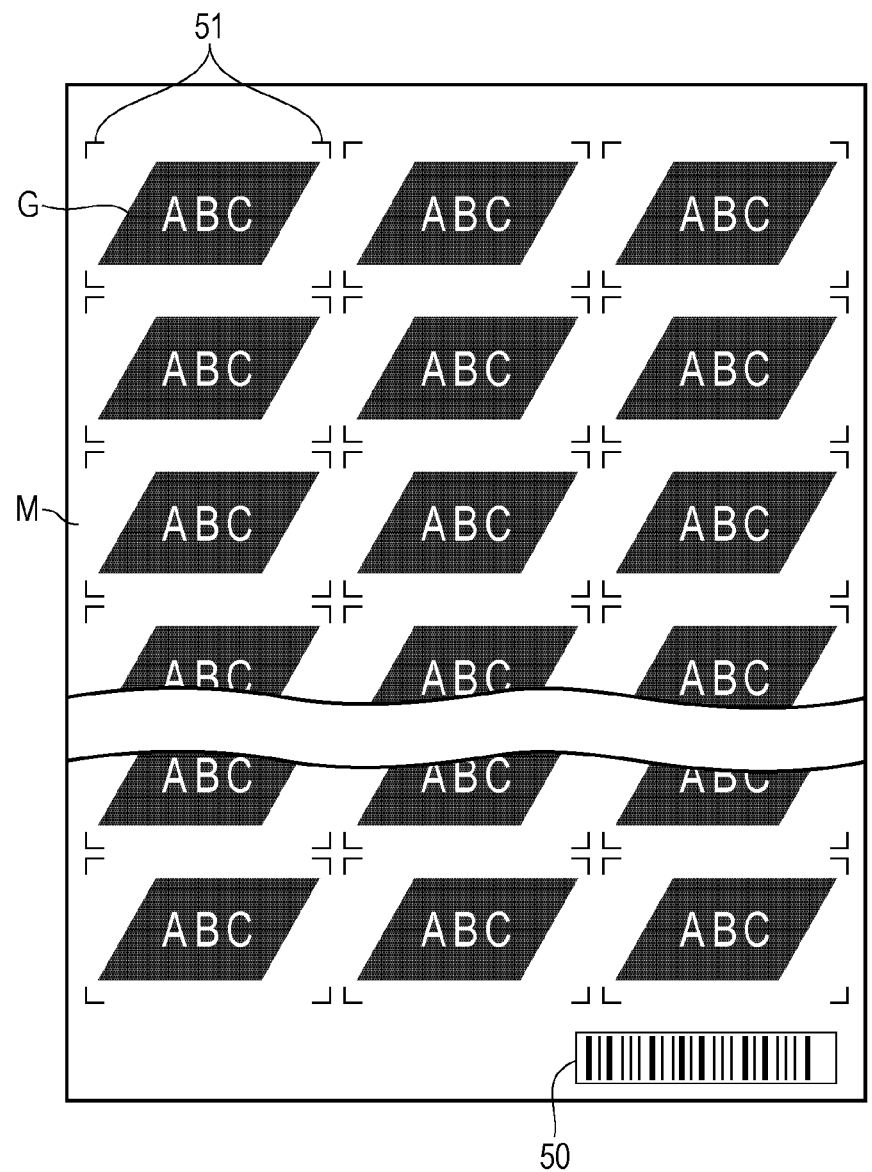
FIG. 10 is a drawing illustrating media where the printing process is performed in the embodiment of the invention.

When the printing is performed, first of all, the print job data and the cut job data are output to the printer 2 from the host computer 3 (step S1). Next, the printer 2 (the print head unit 21) performs the print job based on the print job data (step S2). As shown in FIG. 10, the media M where the plurality of images G that is formed of letters and figures is continuously printed by the printing is wound out as the wind out side roll 13 (see FIG. 1). The printed material (the media M of the wind out side roll 13) after printing is removed from the printer 2 and is stored at a predetermined place (step S3).

Figure 5:
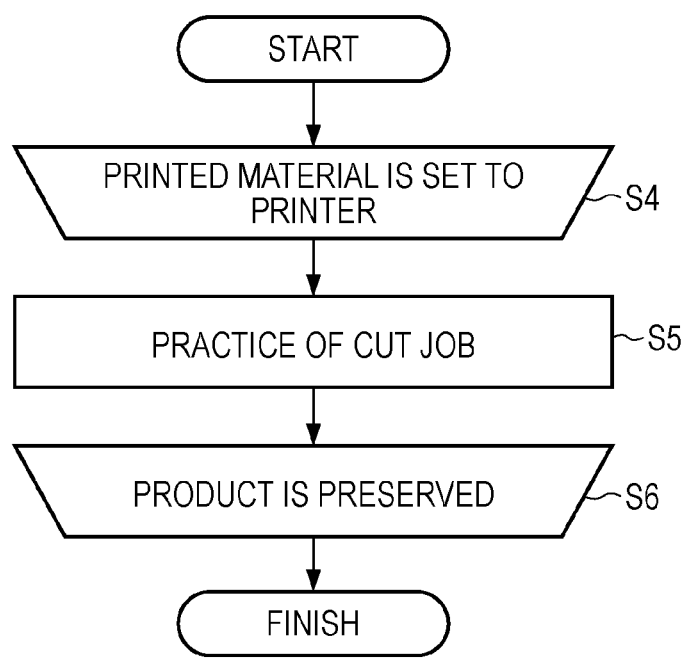
FIG. 5 is a schematic overall flowchart of when processing is performed after the printing in the embodiment of the invention.

FIG. 5 is a schematic overall flowchart when processing is performed after the printing in the embodiment of the invention.

When the processing of the printed material (cutting process) is performed, first of all, the printed material that is stored is set to the printer 2 at the wind out side roll 12 (step S4). Next, the printer 2 (the cutter unit 31) performs the cut job based on the cut job data (step S5). The cut job data includes cutting data 41 that is to be cut out along a frame of the image G shown in FIG. 11B corresponding to the print data 40 shown in FIG. 11A. The product after processing (the media M of the wind out side roll 13) is removed from the printer 2 and is stored in a place different from the printed material (step S6).

Figure 6:
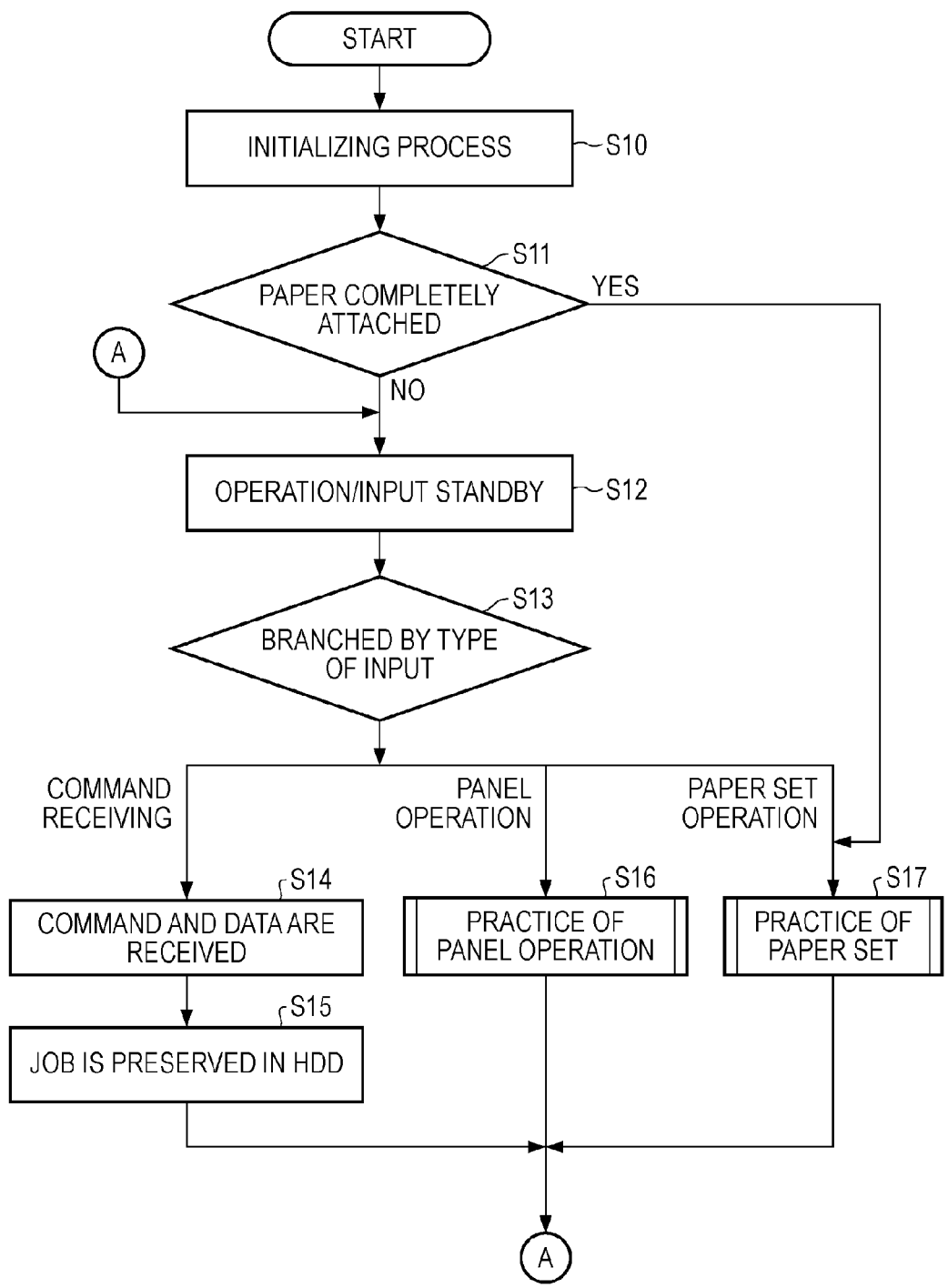
FIG. 6 is a overall flowchart of the printing system in the embodiment of the invention.

FIG. 6 is a schematic overall flowchart of the printer 2 in the embodiment of the invention.

When the power supply is turned ON, the printer 2 performs an initializing setting (step S10). In the initializing process, initialization of the memory, loading of the program and initializing setting of each configuration apparatus are performed. Next, it is determined whether or not the media M as the cutting paper is completely attached at the printer 2 (step S11). When the media M is not completely attached, operation and input standby is performed (step S12). Meanwhile, when the media M is completely attached, paper set-up is performed (step S17).

When the routine shifts to step S12, the flow is branched according to the type of input regarding a command reception, panel operation and paper set operation (step S13). When the command is received, the command and the data are received (step S14). When the panel is operated, panel operation is performed (step S16). When paper set is operated, the paper set is performed (step S17). After a predetermined process is performed according to the type of input, the routine returns to step S12 and operation/input standby are performed again.

When the command and the data are received, and the routine shifts to step S14, the print job data and the cut job data that are included in the received data are associated with each other and stored in the HDD 8 (step S15: storing process). As shown in FIG. 12, the HDD 8 stores data that relates to the print job data and the cut job data. The data includes a job ID for identifying and selecting the related job data in a plurality of sets of job data that is spooled in the HDD 8. For example, the job ID is configured of a serial number (letters and numerals) that receives the job and a copy number (hyphens and numerals) of the job, and the copy number is 0 in the received data. In addition, the data includes an X size (a size in the main scanning direction) and a Y size (a size in the sub-scanning direction) of the image G, the data includes the number in X direction (the main scanning direction) and the number in Y direction (the sub-scanning direction) of the image G that prints with respect to the media M, the type and thickness of the media M, and the print data and cutting data or the like.

Figure 7:
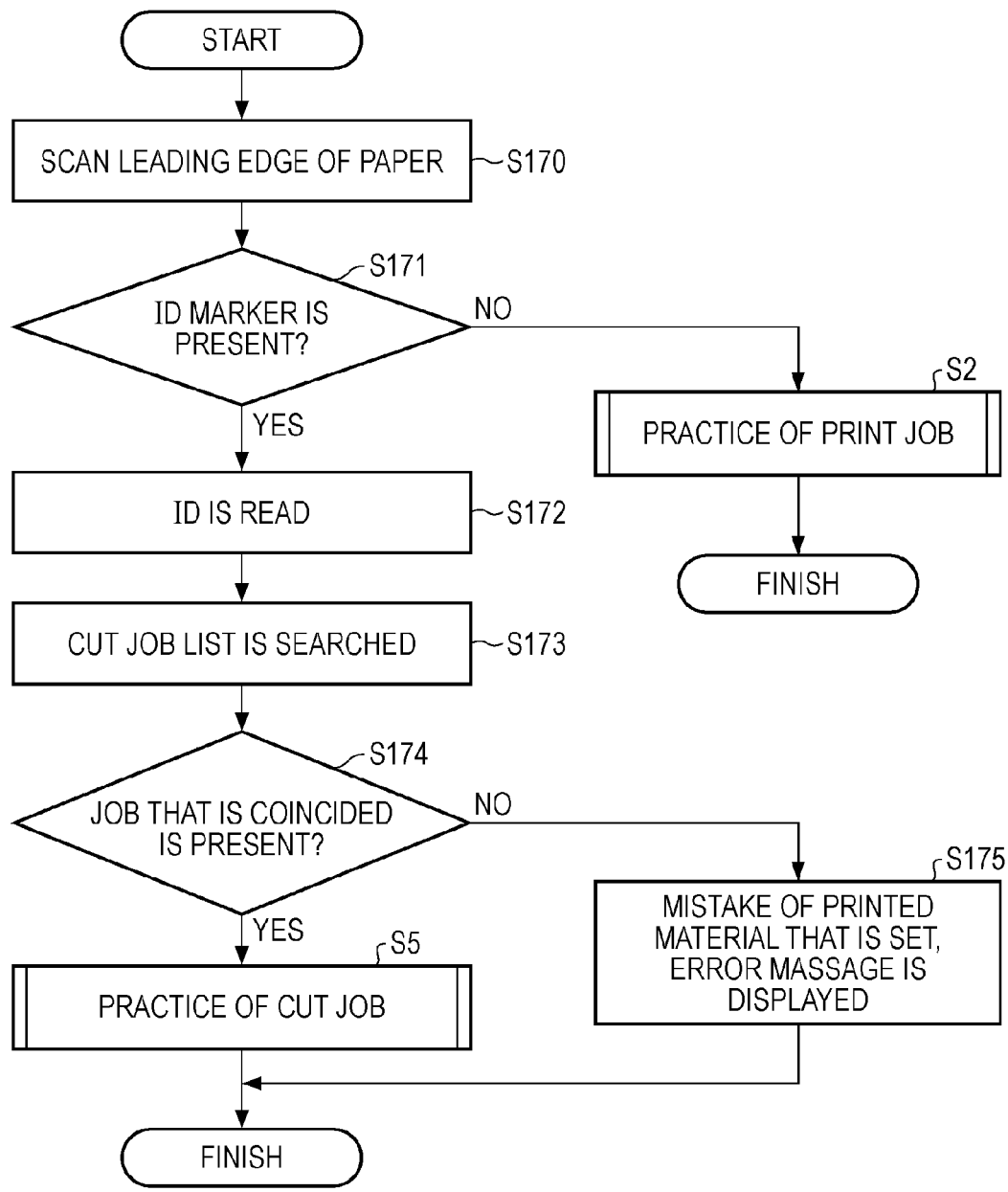
FIG. 7 is a flowchart after step S17 of the printing system in the embodiment of the invention.

FIG. 7 is a flowchart after step S17 of the printing system 1 in the embodiment of the invention.

When the routine shifts to the practice of the paper set, first of all, a leading head of the media M that is wound out from the wind out side roll 12 is scanned by the concentration sensor 32 (step S170). Accordingly, it is determined whether or not the barcode 50 (see FIG. 10) as the ID marker is present (step S171). When the barcode 50 is present, the media M that is set is determined as the printed material that is completely printed and the routine shifts to step S172. After that, the routine shifts to the practice of the cut job (step S5). Meanwhile, when the barcode 50 is not present, the media M that is set is determined as new one and the routine shifts to the practice of the print job (step S2).

Figure 8:
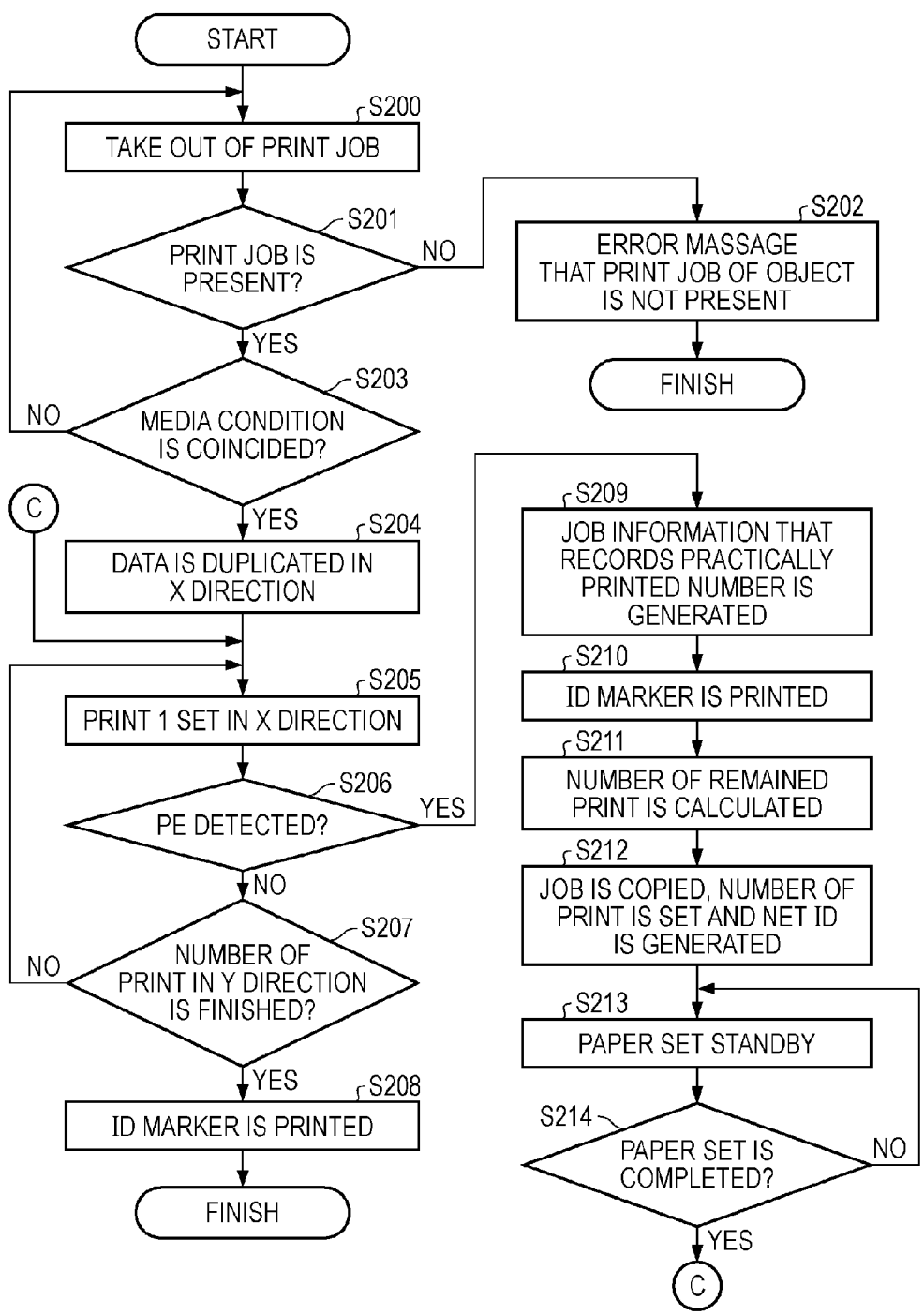
FIG. 8 is a flowchart of the print job of the printing system in the embodiment of the invention.

FIG. 8 is a flowchart of the print job of the printing system 1 in the embodiment of the invention.

When the routine shifts to the practice of the print job, first of all, taking out of the print job is performed (step S200). Specifically, it is determined whether or not the print job data is present in the HDD 8 (step S201). When the print job is not present, an error message such as "the print job of the object is not present" is displayed at the display or the like that is connected to for example, the host computer 3 (step S202) and the print job is finished.

Meanwhile, when the print job data is stored in the HDD 8, it is determined whether or not the media M that is set and media condition (for example, the paper type and the paper thickness shown in FIG. 12) that is included in the print job data that is removed coincide with each other (step S203). When the media condition does not coincide with the media, the routine returns to step S200 and the print job data which coincides with the media condition is searched. Meanwhile, when the media condition coincides with the media, the routine shifts to step S204 and the printing is performed based on the print job data that is removed.

First of all, in step S204, duplication of the print data 40 in the X direction is performed based on the print job data. Here, the print data 40 is duplicated three times in the X direction. Next, the printing is performed as one set in the X direction based on the duplicated print data 40 (step S205). Next, it is determined whether or not PE (Paper End) is detected when the media M for printing of the next set is transported in Y direction (step S206: a rear end detection process). The rear end detection sensor 37 that is provided further upstream in the transportation direction than the ink jet head 22 performs the PE detection.

When the PE is not detected, it is determined whether or not the number of images in the Y direction reaches the number of images (100 sets in the embodiment) of the print job data to print in the Y direction (step S207). When the number of images in the Y direction does not reach a predetermined number of images, the routine returns to step S205 and the printing is performed. Meanwhile, when the number of images in the Y direction reaches a predetermined number of images, after the printing of the image G is finished, the barcode 50 is printed as the ID marker (step S208: printing process) and the print job is finished as shown in FIG. 10. The barcode 50 has a job ID shown in FIG. 12.

Returning to FIG. 7, when the printed material is set again to the printer 2 to perform the cut job after the printed material is stored, it is determined if the ID marker is present in step S171. In addition, in the print job of the embodiment, when the barcode 50 is printed after printing is performed with respect to the media M that is wound out from the wind out side roll 12 in the roll-to-roll manner, since the printed barcode 50 is not positioned at the center but at the outer periphery side in the wind out side roll 13 that is paired with the wind out side roll 12, in the cut job. The media M is set to the wind out side roll 12 of the printer 2 as it is and the leading head thereof is wound out without rewinding so that the barcode 50 that is ahead of the printed image G may be read from the concentration sensor 32 (step S172: a code reading process).

Next, job data spooled in the HDD 8 is searched based on the job ID that is read from the barcode 50 (step S173) and it is determined whether or not the cut job that coincides with the printed material (print job) is present (step S174). As a result of the search, when the cut job data that coincides with the job ID is not present, the printed material that is set is determined as a mistake and the information thereof is displayed as an error message (step S175) and the routine is finished. Meanwhile, as a result of the search, when the cut job data (see FIG. 12) that coincides with the job ID is present, the routine shifts to perform the cut job based on the cut job data (step S5: the post processing). In other words, the operator is not aware of the post processing job and may simply set the printed material to the printer 2.

Figure 9:
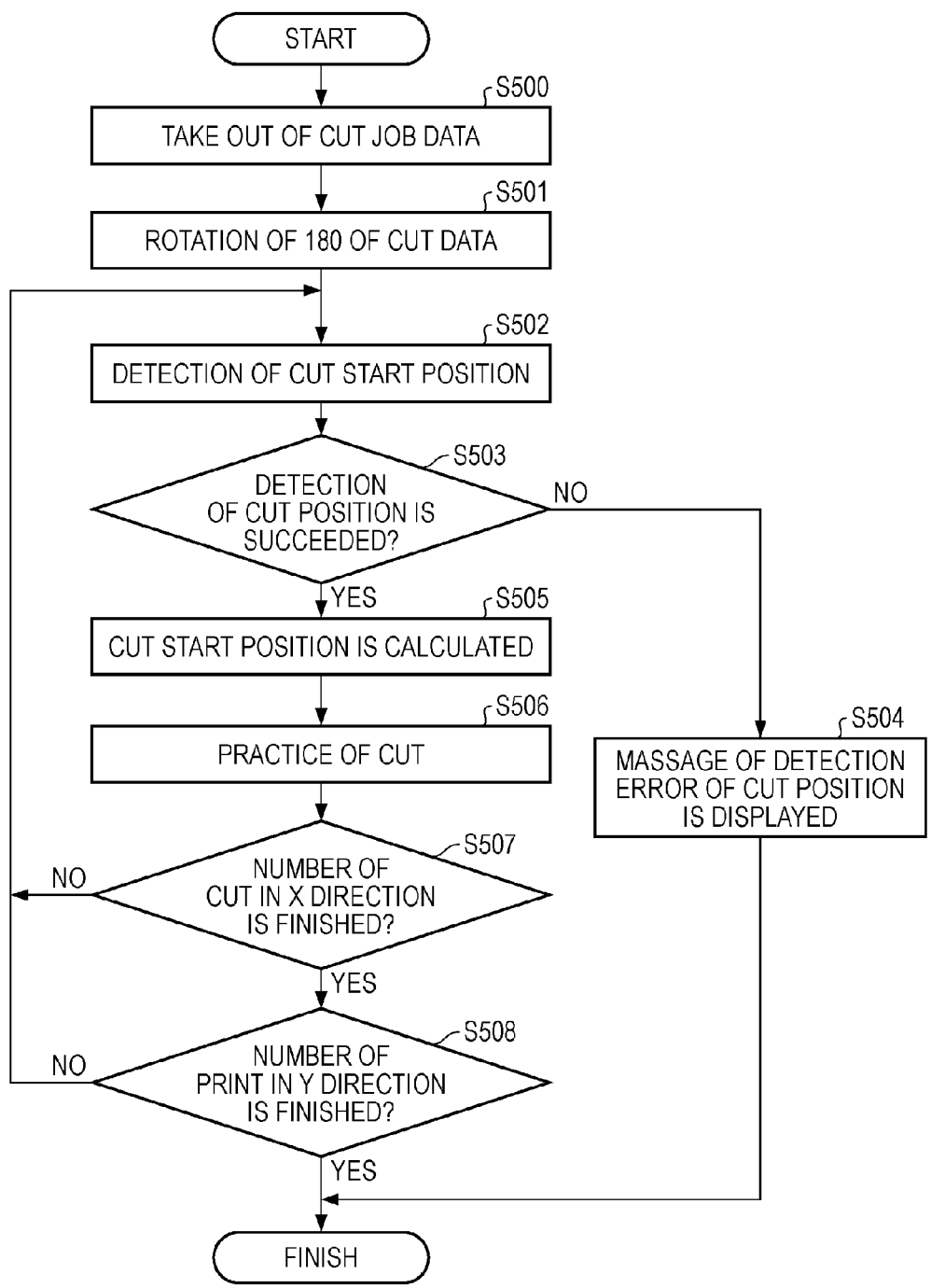
FIG. 9 is a flowchart of a cut job of the printing system in the embodiment of the invention.

FIG. 9 is a flowchart of the cut job of the printing system 1 in the embodiment of the invention.

When the routine shifts to perform the cut job, first of all, taking out of the cut job from the HDD 8 is performed (step S500). Next, 180° rotation of the cutting data 41 is performed (step S501). In the embodiment, from the viewpoint of the workability at the cut job, without rewinding the printed material and the printed material is set to the wind out side roll 12 of the printer 2 as it is. Accordingly, the barcode 50 shown in FIG. 10 is wound out as the leading head so that the image G becomes the reverse direction.

Next, a start position of the cut is detected (step S502). In the embodiment, the crop mark 51 that is printed with the image G is read by the concentration sensor 32 and success or failure of the detection of the cut position is determined (step S503). When the detection of the cut position fails, the error message of the detection of the cut position is displayed (step S504) and the routine is finished. Meanwhile, when the detection of the cut position is succeeded, the routine shifts to step S505.

In step S505, calculation of the start position of the cut is calculated from the detected crop mark 51. Next, cutting is performed based on the calculation (step S506). The cutter blade 35 moves along the frame of the image G according to the practice of the cutting and the image G is cut out. Next, it is determined whether or not the number of cuts in X direction reaches a predetermined number of cuts of the cut job data (three cuts in the embodiment) (step S507). When the number of cuts in the X direction does not reach the predetermined number of cuts, the routine returns to step S502 and cutting is performed. Meanwhile, when the number of cuts in the X direction reaches the predetermined number of cuts, the routine shifts to step S508.

In step S508, it is determined whether or not the number of cuts in the Y direction reaches a predetermined number of cuts of the cut job data (100 sets in the embodiment). When the number of cuts in the Y direction does not reach the predetermined number of cuts, the routine returns to step S502 and cutting is performed after the media M for cutting of the next set is transported in the Y direction. Meanwhile, when the number of cuts in the Y direction reaches the predetermined number of cuts, the cut job is completed and the routine is finished.

Returning to FIG. 8, next, description will be given regarding a flow of a case where the print job may not be completed.

When the PE is detected during the print job (when the paper cutting occurs (see, FIG. 13A)), the CPU (the control unit) 4 suspends the printing at the printer 2 and the routine shifts to step S209 (a control process). First of all, in step S209, the CPU (post processing job data generation unit) 4 generates the post processing job data (see FIG. 14) according to the number (for example, the number in Y direction: 70 sets) of images G that is printed on the media M by the printer 2 (the post processing job data generation process).

Specifically, the CPU 4 duplicates the data shown in FIG. 12 and updates the last number of the job ID to 1 from 0. In addition, the data shown in FIG. 14 where the number in the Y direction is corrected to 70 from 100 is generated and is stored in the HDD 8. Accordingly, when the number of images actually printed with respect to the media M by the printer 2 does not satisfy the number (the number in Y direction: 100 sets) of images to be printed, the post processing job data is generated according to the number (the number in Y direction: 70 sets) of images that is actually printed (step S209).

Figure 13A:
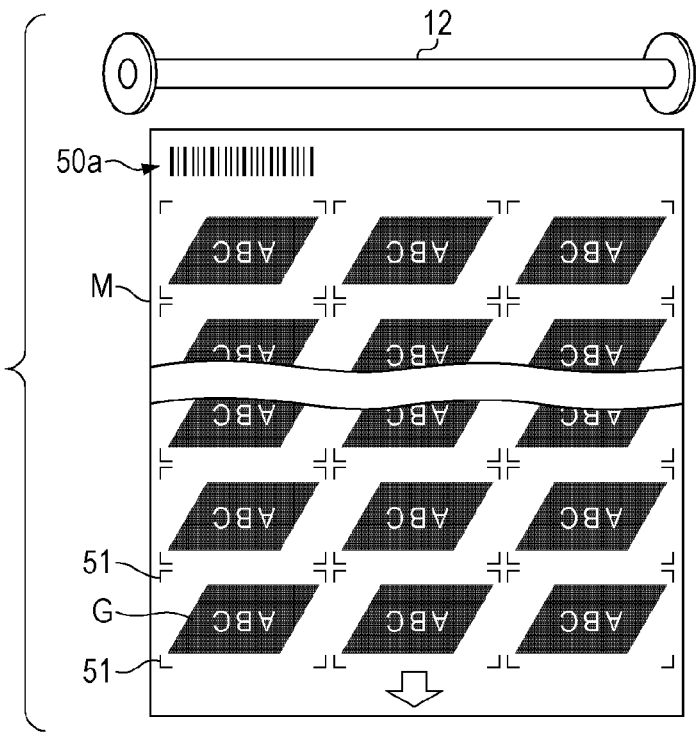
FIGS. 13A and 13B are drawings explaining a printing process and a cutting process in the embodiment of the invention.

Next, as shown in FIG. 13A, a barcode 50a having the generated job ID is printed (step S210). In the embodiment, since the rear end detection sensor 37 detects the rear end of the media M further upstream than the ink jet head 22 in the transportation direction, finishing of the printing with respect to the current media M may be detected with enough distance. In addition, a printing area to print the barcode 50a may be secured after the image G is printed.

Figure 13B:
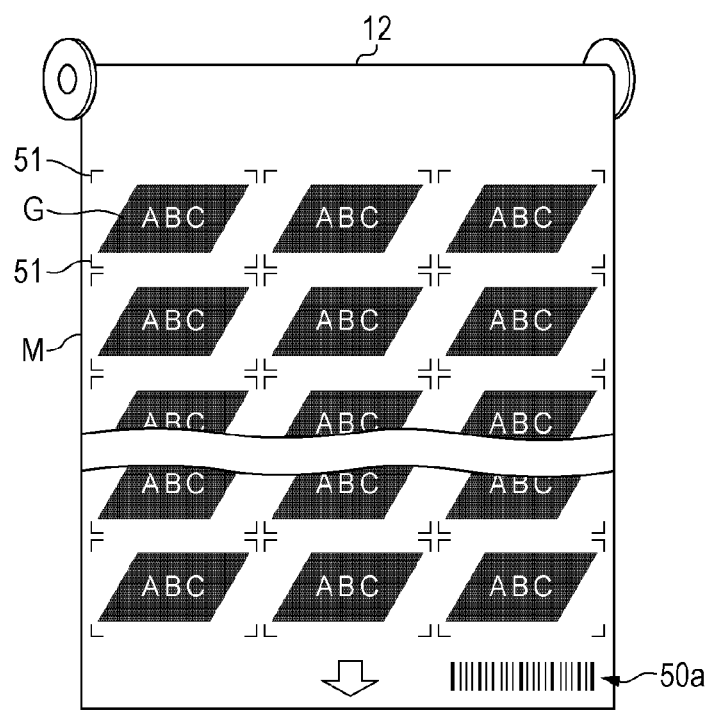

After the printed material is stored, when the printed material sets at the printer 2 that performs the cut job, the cut job data (see FIG. 14) that coincides with the printed material may be selected from the job data that is spooled in the HDD 8 based on the job ID that is read from the barcode 50a (step S173). Accordingly, in the cut job, as shown in FIG. 13B, the number (70 sets) of the cuts in the Y direction is performed according to the number of images (the number in Y direction: 70 sets) that are printed on the printed material. Thus, even though the number of images actually printed with respect to the media M by the printer 2 does not satisfy the number of images to be printed, the post processing job data is generated according to the number of images actually printed. In addition, in the post processing, since the post processing job corresponding to the practical print job (the number of images) is performed, the printed material may not be a defective product.

Next, the CPU (the print job data generation unit) 4 completes the remainder of the print job that does not satisfy the number of images to be printed. A second print job data (see FIG. 16) is generated according to the number (the number in Y direction: 70 sets) of images G that are printed on the media M by the printer 2 (the print job data generation process). Specifically, the CPU 4 calculates the remaining number of printing times (the number in the Y direction: 30 sets) based on the number of images (the number in Y direction: 100 sets) that are to be printed and the number of images (the number in Y direction: 70 sets) that are actually printed (step S211). In addition, the CPU 4 duplicates the data shown in FIG. 12, and updates the last number of the job ID to 2 from 0. The data that is shown in FIG. 16, where the number in the Y direction is corrected to 30 from 100 is generated and stored in the HDD 8 (step S212).

Figure 15A:
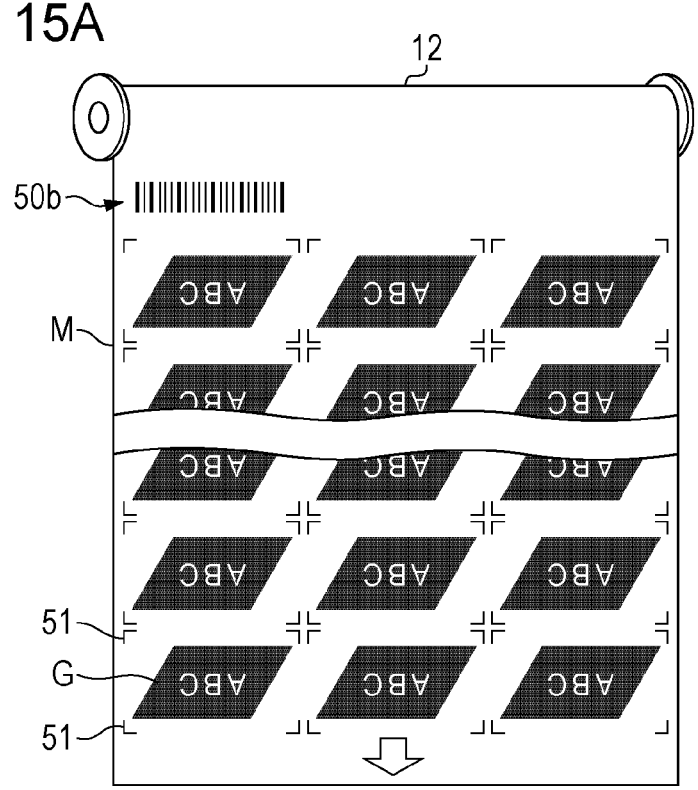
FIGS. 15A and 15B are drawings explaining a printing process and a cutting process in the embodiment of the invention.

Next, standby of a new set of media M is performed (step S213). Here, the information in which the media M that cuts the paper is removed and the information in which new media M is set is displayed for example, on the display or the like that is connected to the host computer 3. Next, it is determined whether or not the new set of the media M is completed (step S214). When the set is not completed, the routine returns to step S213 and the set standby is performed. Meanwhile, when the set is completed, the routine returns to step S205 and the suspended printing restarts. Here, the printing restarts based on the newly generated second print job data. Specifically, the printing is performed until the number of images in the Y direction reaches the number of images (30 sets in the embodiment) that is to be printed in the Y direction of the second print job data. When the number of images in the Y direction reaches the predetermined number of images, as shown in FIG. 15A, a barcode 50b as the ID marker is printed (step S208: printing process) after the printing of the image G is finished and the print job is finished. The barcode 50b has the job ID shown in FIG. 16.

Figure 15B:
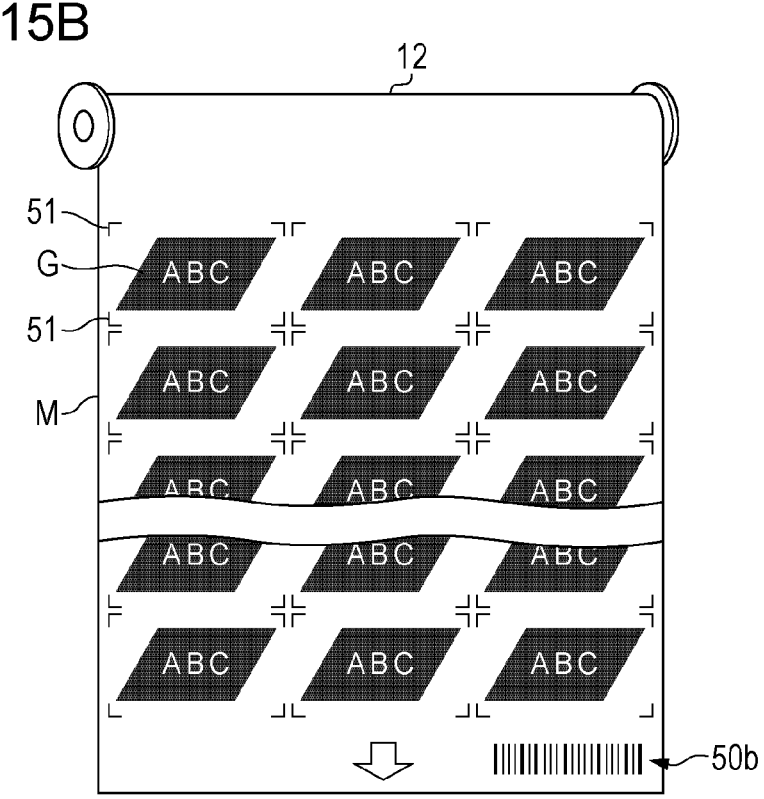

After the printed material is stored, when the printed material resets at the printer 2 that performs the cut job, the cut job data (see FIG. 16) that coincides with the printed material may be selected from the job data that is spooled in the HDD 8 based on the job ID read from the barcode 50b (step S173). Accordingly, in the cut job, as shown in FIG. 15B, the number (30 sets) of cuts in the Y direction is performed according to the number of images (the number in Y direction: 30 sets) that are printed on the printed material. Thus, even though the number of images actually printed with respect to the media M by the printer 2 does not satisfy the number of images to be printed, and the remainder of the print job which is not satisfied to the number of images to be printed may be completed. In addition, even though the print job extends over a plurality of media M with a massive number of images, the number of images actually printed with respect to one media M is reliably read by the job ID so that the post processing job corresponding to the print job (the number of images) may be performed in the post processing and the printed material may not be a defective product.

According to the above-described embodiment, the embodiment employs the printing system 1 that has the HDD 8 that associates and stores the print job data and the post processing job data; the print head unit 21 that prints the barcode 50 regarding the association on the media M when the image is printed on the media M based on the print job data; the concentration sensor 32 that reads the barcode 50 printed on the media M; and the cutter unit 31 that selects the post processing job data associated from the HDD 8 based on the barcode 50 that is read and performs the post processing with respect to the media M based on the selected post processing job data. Thus, the print job data and the post processing job data are associated and may be spooled in the HDD 8. In addition, when printing is performed based on the print job data, the barcode 50 regarding the association is also printed on the media M. Since the barcode 50 is printed on the media M after printing, even though the media M is temporarily stored, the post processing job that coincides with the media M (the print job) from the post processing spooled in the HDD 8 may be selected and performed when the barcode 50 is read.

Accordingly, in the embodiment, the post processing may be exactly performed with respect to the printed material that is processed off-line after printing.

Hereinabove, preferred embodiments of the invention have been described with reference to the drawings; however, the invention is not limited to the embodiments. The general shape, assembly or the like of each configuration member illustrated in the above-described embodiments is an example, and various changes may be performed based on design requirements within a range that does not depart from the gist of the invention.

Figure 17:
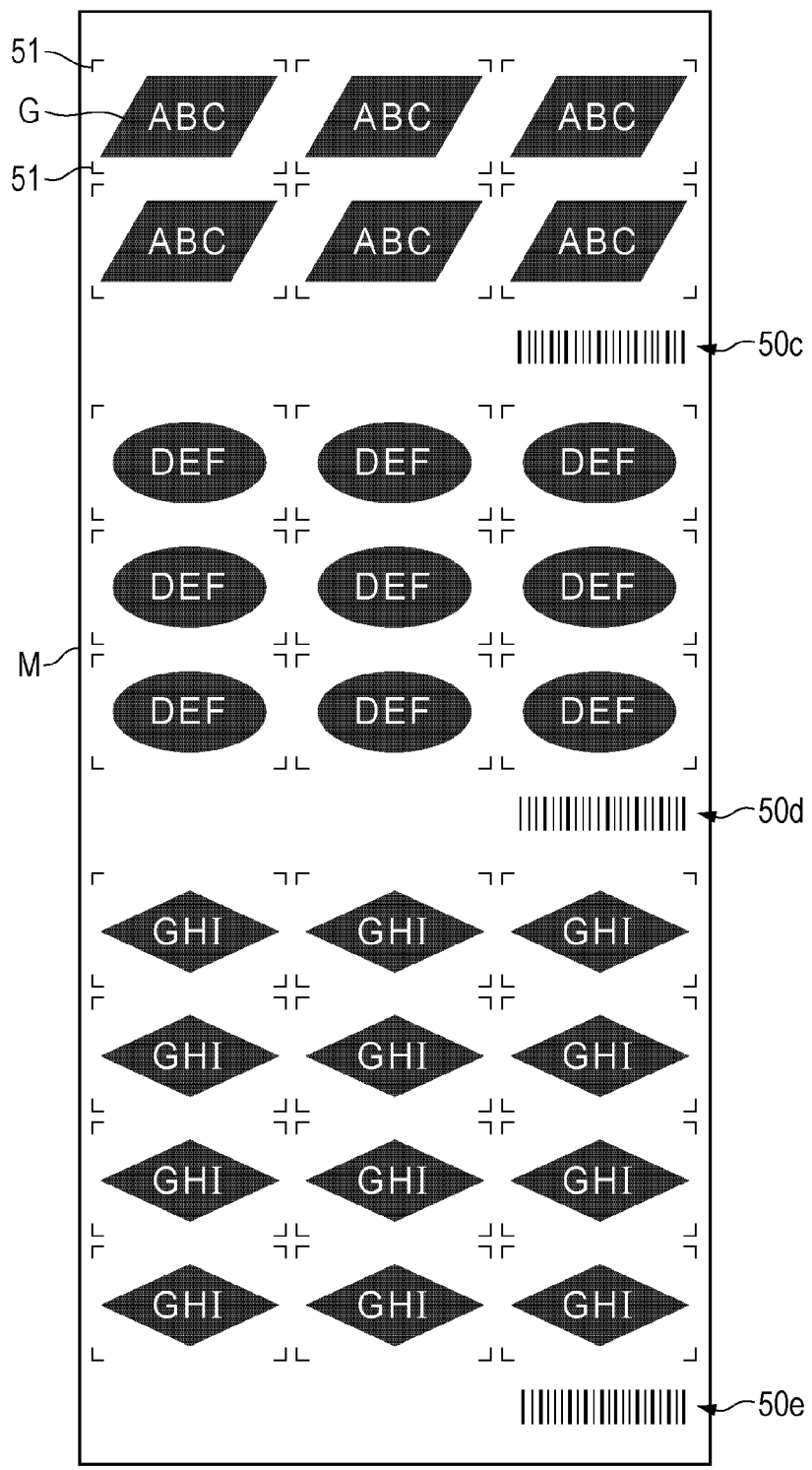
FIG. 17 is a drawing explaining a printing process and a cutting process in another embodiment of the invention.

For example, in the above-described embodiment, description was given regarding the embodiment where one print job is performed with respect to one media M; however, the invention is not limited to the embodiment. For example, plural types of print job data that prints on the same media M is stored in the HDD 8 and as shown in FIG. 17, the embodiment where plural types of print job is performed on the same media M may be employed. Further in this case, the barcodes 50c, 50d and 50e are printed in every print job so that it may be known beforehand how many cuts is desirable in the post processing when the corresponding number of images is included in the data that is related by each job ID. Furthermore, since the cut job may be changed in one roll, it is not necessary that the media M be divided in every print job.

In addition, in the above-described embodiment, the cutting process as the post processing is exemplified; however, the invention is not limited to the embodiment. For example, the same as in the above-described embodiment, the post processing such as an overlap printing process that prints using other ink as the post processing, a laminate process, a folding process, a sheet biasing process, embossing process or the like may also response the automation.

In addition, in the above-described embodiment, roll-shaped cutting paper as the media M is exemplified; however, the invention is not limited to the embodiment. For example, the media M may be a zigzag shape, or the media M may be a simple rectangular sheet shape. In the case of such shapes, the barcode 50 may be printed at the leading head.

In addition, in the above-described embodiment, the description is given as the example of the printer 2; however, the invention is not limited to a printer and apparatus such as a copy machine, facsimile or the like may be used.

In addition, as an embodiment of the printing unit, a configuration that ejects or discharges liquid other than ink may be employed. The invention may be used in various types of liquid ejecting apparatus that, for example, has a liquid ejecting head or the like discharging liquid droplets of a micro quantity. In addition, the liquid droplet may be in a liquid state that is discharged from the liquid ejecting apparatus and also includes droplets of which the tail is traced in a granule shape, a flow shape and a thread shape. In addition, the liquid that is referred to here may be a material that may be ejected from the liquid ejecting apparatus. For example, material may be in a liquid state. The liquid phase material of which viscosity is high or low, sol, gel water, and other flow states such as inorganic solvents, organic solvents, solutions, liquid phase resin and liquid phase metals (metal melt) may be used. In addition, the material also includes not only liquid as an embodiment of material but also particles of functional material that is configured of solid materials such as pigment, metal particles or the like that are dissolved, dispersed or mixed into a solvent. In addition, as described above in the embodiment, representative example of liquid is ink. Here, ink includes various types of liquid compositions such as general water-based ink, oil-based ink, gel ink, hot-melt ink, UV-curing ink or the like.

What is claimed is:

1. A printing system comprising:
   a storage unit that associates and stores print job data and post processing job data;
   a printing unit that prints a code regarding the association on media when an image is printed on the media based on the print job data, the code and the image being printed on the same media;
   a code reading unit that reads the code that is printed on the media; and
   a post processing unit that selects the post processing job data that is associated from the storage unit based on the read code and performs the post processing with respect to the media based on the selected post processing job data,
   wherein the printing unit is positioned on a carriage of the printing system, the code reading unit is located on the carriage adjacent to the printing unit, and the post processing unit is located on the carriage adjacent to the printing unit.

2. The printing system according to claim 1,
   wherein the print job data includes data regarding the number of images printed on the media, and
   the printing unit has a post processing job data generation unit that generates the post processing job data according to the number of the images printed on the media based on the print job data.

3. The printing system according to claim 2,
   wherein the printing unit has a print job data generation unit that generates second print job data according to the number of the images printed on the media based on the print job data.

4. The printing system according to claim 1,
   wherein the printing unit prints the code after the image is printed on the media based on the print job data.

5. The printing system according to claim 4,
   wherein the printing unit prints on the media by a roll-to-roll manner 6. The printing system according to claim 1,
   wherein the storage unit stores plural types of print job data that is printed on the same media.

7. A printing method comprising:
   associating and storing print job data and post processing job data in a storage unit;
   printing a code regarding the association on media when an image is printed on the media based on the print job data, the code and the image being printed on the same media;
   reading the code that is printed on the media; and
   selecting the post processing job data that is associated from the storage unit based on the read code and performing the post processing with respect to the media based on the selected post processing job data,
   wherein the printing is done by a printing unit that is positioned on a carriage of a printing system, a code reading unit that is located on the carriage the printing unit reads the code, and a post processing unit that is located on the carriage adjacent to the printing unit performs the post processing.

8. A printing system comprising:
   a storage unit that associates and stores print job data and post processing job data;
   a printing unit that prints a code regarding the association on media when an image is printed on the media based on the print job data, the code and the image being printed on the same media;
   a code reading unit that reads the code that is printed on the media; and
   a post processing unit that selects the post processing job data that is associated from the storage unit based on the read code and performs the post processing with respect to the media based on the selected post processing job data,
   wherein the printing unit is positioned on a carriage of the printing system, the code reading unit is a sensor that is located on the carriage adjacent to a first side of the printing unit, and the post processing unit is a cutting unit that is located on the carriage adjacent to a second side of the printing unit.

9. A printing system comprising:
   a storage unit that associates and stores print job data and post processing job data;
   a printing unit that prints a code regarding the association on media when an image is printed on the media based on the print job data, the code and the image being printed on the same media;
   a code reading unit that reads the code that is printed on the media; and
   a post processing unit that selects the post processing job data that is associated from the storage unit based on the read code and performs the post processing with respect to the media based on the selected post processing job data,
   wherein a sensor unit determines if a code regarding the association on media when an image is printed on the media based on the print job data has been printed on the media, wherein the printing unit prints the code when it is determined that the code has not been printed.

* * * * *